(12) United States Patent
Suzuki et al.

(10) Patent No.: US 10,491,385 B2
(45) Date of Patent: Nov. 26, 2019

(54) INFORMATION PROCESSING SYSTEM, INFORMATION PROCESSING METHOD, AND RECORDING MEDIUM FOR IMPROVING SECURITY OF ENCRYPTED COMMUNICATIONS

(71) Applicant: AdIn Research, Inc., Tokyo (JP)

(72) Inventors: Nobuharu Suzuki, Tokyo (JP); Koji Sasaki, Tokyo (JP)

(73) Assignee: AdIn Research, Inc., Tokyo (JP)

( * ) Notice: Subject to any disclaimer, the term of this patent is extended or adjusted under 35 U.S.C. 154(b) by 0 days.

(21) Appl. No.: 16/213,822

(22) Filed: Dec. 7, 2018

(65) Prior Publication Data

US 2019/0222417 A1  Jul. 18, 2019

(30) Foreign Application Priority Data

Jan. 12, 2018 (JP) .................................. 2018-003269

(51) Int. Cl.
*H04L 9/08* (2006.01)
*H04L 9/32* (2006.01)

(52) U.S. Cl.
CPC .......... *H04L 9/0861* (2013.01); *H04L 9/0819* (2013.01); *H04L 9/3231* (2013.01)

(58) Field of Classification Search
CPC ............................ H04L 9/0861; H04L 9/0819
See application file for complete search history.

(56) References Cited

U.S. PATENT DOCUMENTS 4,200,770 A 4/1980 Hellman et al.
5,677,954 A 10/1997 Hirata et al.
(Continued)

FOREIGN PATENT DOCUMENTS

| JP | H10-276185 A | 10/1998 |
|---|---|---|
| JP | 2001-510314 A | 7/2001 |
| JP | 2003-051818 A | 2/2003 |
| JP | 2009-523396 A | 6/2009 |

(Continued)

OTHER PUBLICATIONS

Kazuto Ogawa, "Security on Broadcasting and Content Distribution Services," ITE Technical Report, Oct. 15, 2010, pp. 9-16, vol. 34, No. 42.

*Primary Examiner* — Ali Shayanfar
(74) *Attorney, Agent, or Firm* — Fitch, Even, Tabin & Flannery LLP (57) ABSTRACT

An information processing system includes a first information processing apparatus, which authenticates second and third information processing apparatuses, acquires first data from the second information processing apparatus, and transmits second data indicating a method of generating a key from the first data, to the second and third information processing apparatuses; the second information processing apparatus, which transmits the first data to the first and third information processing apparatuses, acquires the second data from the first information processing apparatus, generates the key based on the first and second data, and communicates with the third information processing apparatus based on the key; and the third information processing apparatus, which acquires the first data from the second information processing apparatus, acquires the second data from the first information processing apparatus, generates the key based on the first and second data, and communicates with the second information processing apparatus based on the key.

4 Claims, 10 Drawing Sheets

(56) References Cited

U.S. PATENT DOCUMENTS

| | | | |
|---|---|---|---|
| 5,740,361 A | 4/1998 | Brown | |
| 7,203,836 B1 | 4/2007 | Maringer et al. | |
| 8,412,926 B1 * | 4/2013 | Gerraty | H04L 63/0428 |
| | | | 380/255 |
| 10,237,248 B2 * | 3/2019 | Karkkainen | H04L 9/0662 |
| 2002/0147820 A1 | 10/2002 | Yokote | |
| 2007/0168662 A1 | 7/2007 | Escott et al. | |
| 2010/0250960 A1 * | 9/2010 | Ogura | G06F 21/10 |
| | | | 713/189 |
| 2014/0281541 A1 * | 9/2014 | Cherian | H04W 12/06 |
| | | | 713/169 |
| 2016/0014100 A1 | 1/2016 | Matsuo | |
| 2016/0150236 A1 * | 5/2016 | Maeda | H04N 19/90 |
| | | | 375/240.08 |
| 2016/0211974 A1 * | 7/2016 | Komano | H04L 63/06 |
| 2016/0294790 A1 * | 10/2016 | Susan | H04L 63/0435 |
| 2016/0371151 A1 * | 12/2016 | Masuda | G06F 16/27 |
| 2017/0039364 A1 * | 2/2017 | Sadhasivan | H04L 9/0819 |
| 2017/0155512 A1 * | 6/2017 | Ogura | H04L 9/32 |
| 2017/0359318 A1 * | 12/2017 | Wei | H04L 9/14 |
| 2017/0372085 A1 * | 12/2017 | Howe | G06F 21/62 |
| 2018/0165427 A1 * | 6/2018 | Verthein | G06F 21/10 |
| 2019/0086317 A1 * | 3/2019 | Inokuchi | G01N 15/147 |

FOREIGN PATENT DOCUMENTS

| | | |
|---|---|---|
| JP | 2016-019233 A | 2/2016 |
| WO | 95/002292 A1 | 1/1995 |
| WO | 02/093824 A2 | 11/2002 |

\* cited by examiner

INFORMATION PROCESSING SYSTEM, INFORMATION PROCESSING METHOD, AND RECORDING MEDIUM FOR IMPROVING SECURITY OF ENCRYPTED COMMUNICATIONS

CROSS-REFERENCE TO RELATED APPLICATION

The present application is based on and claims priority under 35 U.S.C. § 119 to Japanese Patent Application No. 2018-003269, filed on Jan. 12, 2018, the contents of which are incorporated herein by reference in their entirety.

BACKGROUND OF THE INVENTION

1. Field of the Invention

The present invention relates to an information processing system, an information processing method, and a recording medium.

2. Description of the Related Art

Conventionally, there has been known a method of obfuscating data, which is transmitted and received in communication, by using a key, so that contents of the data are not leaked even if the data is fraudulently acquired.

For example, a technique referred to as the Diffie-Hellman key exchange method (hereinafter referred to as the "DH method") is known (see, for example, Patent Document 1).

Patent Document 1: U.S. Pat. No. 4,200,770

However, according to the conventional method, if a so-called man-in-the-middle attack, etc., is performed, the key may be fraudulently acquired at the time of exchanging keys, etc. Therefore, if the key is fraudulently acquired, even if the data is obfuscated with the key, there is a possibility that the data may be decrypted using the fraudulently acquired key, and the security may be insufficient in some cases.

SUMMARY OF THE INVENTION

An aspect of the present invention provides an information processing system, an information processing method, and a recording medium, in which one or more of the disadvantages of the related art are reduced.

According to one aspect of the present invention, there is provided an information processing system at least including a first information processing apparatus; a second information processing apparatus; and a third information processing apparatus, wherein the first information processing apparatus includes an authenticating unit configured to authenticate the second information processing apparatus and the third information processing apparatus, a first data acquiring unit configured to acquire first data from the second information processing apparatus, and a second data transmitting unit configured to transmit second data indicating a method of generating a key based on the first data, to the second information processing apparatus and the third information processing apparatus, and wherein the second information processing apparatus includes a first data transmitting unit configured to transmit the first data to the first information processing apparatus and the third information processing apparatus, a second data acquiring unit configured to acquire the second data from the first information processing apparatus, a key generating unit configured to generate the key based on the first data and the second data, and a communicating unit configured to communicate with the third information processing apparatus based on the key, and wherein the third information processing apparatus includes a first data acquiring unit configured to acquire the first data from the second information processing apparatus, a second data acquiring unit configured to acquire the second data from the first information processing apparatus, a key generating unit configured to generate the key based on the first data and the second data, and a communicating unit configured to communicate with the second information processing apparatus based on the key.

DETAILED DESCRIPTION OF THE PREFERRED EMBODIMENTS

A specific example according to an embodiment of the present invention will be described below by referring to the accompanying drawings.

<Overall Configuration Example>

Figure 1:
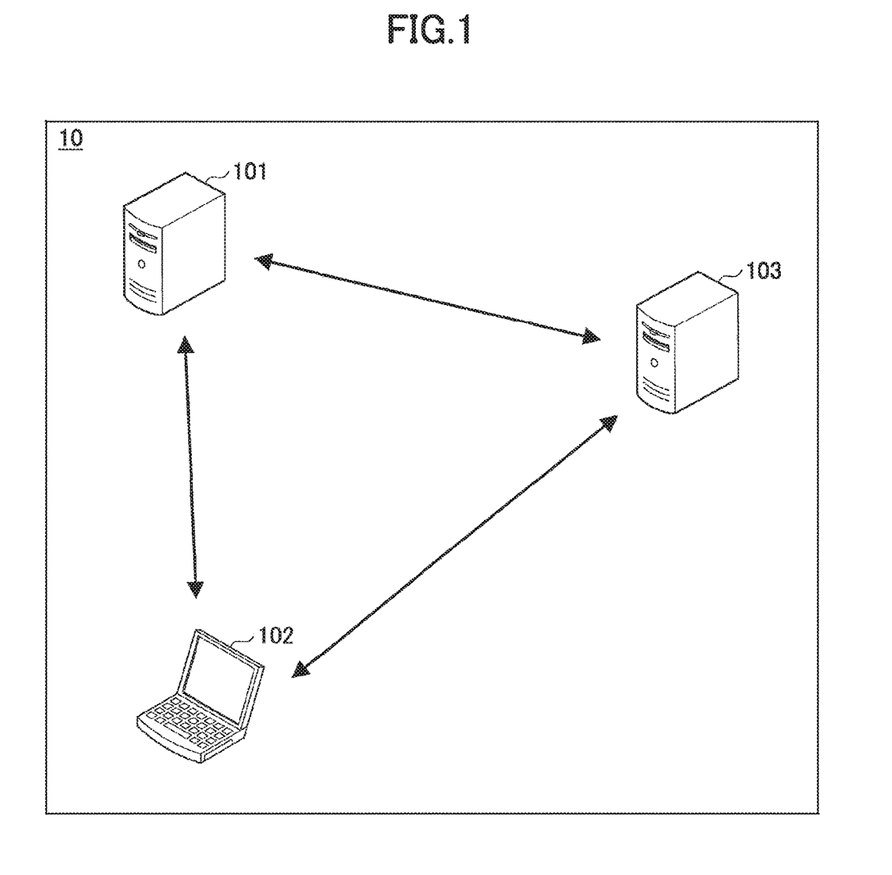
FIG. 1 is a schematic diagram illustrating an overall configuration example of an information processing system according to an embodiment of the present invention.

FIG. 1 is a schematic diagram illustrating an overall configuration example of an information processing system according to an embodiment of the present invention. For example, as illustrated in the figure, an information processing system 10 has a configuration including a first information processing apparatus 101, a second information processing apparatus 102, and a third information processing apparatus 103.

The first information processing apparatus 101, the second information processing apparatus 102, and the third information processing apparatus 103 are connected to each other via a network, etc., and can mutually transmit and receive data by using the network, etc.

Hereinafter, an example of obfuscating data transmitted and received by communication between the second information processing apparatus 102 and the third information processing apparatus 103 will be described.

The information processing system 10 is not limited to the illustrated overall configuration. For example, the information processing system 10 may have an overall configuration including another information processing apparatus.

<Hardware Configuration Example>

Figure 2:
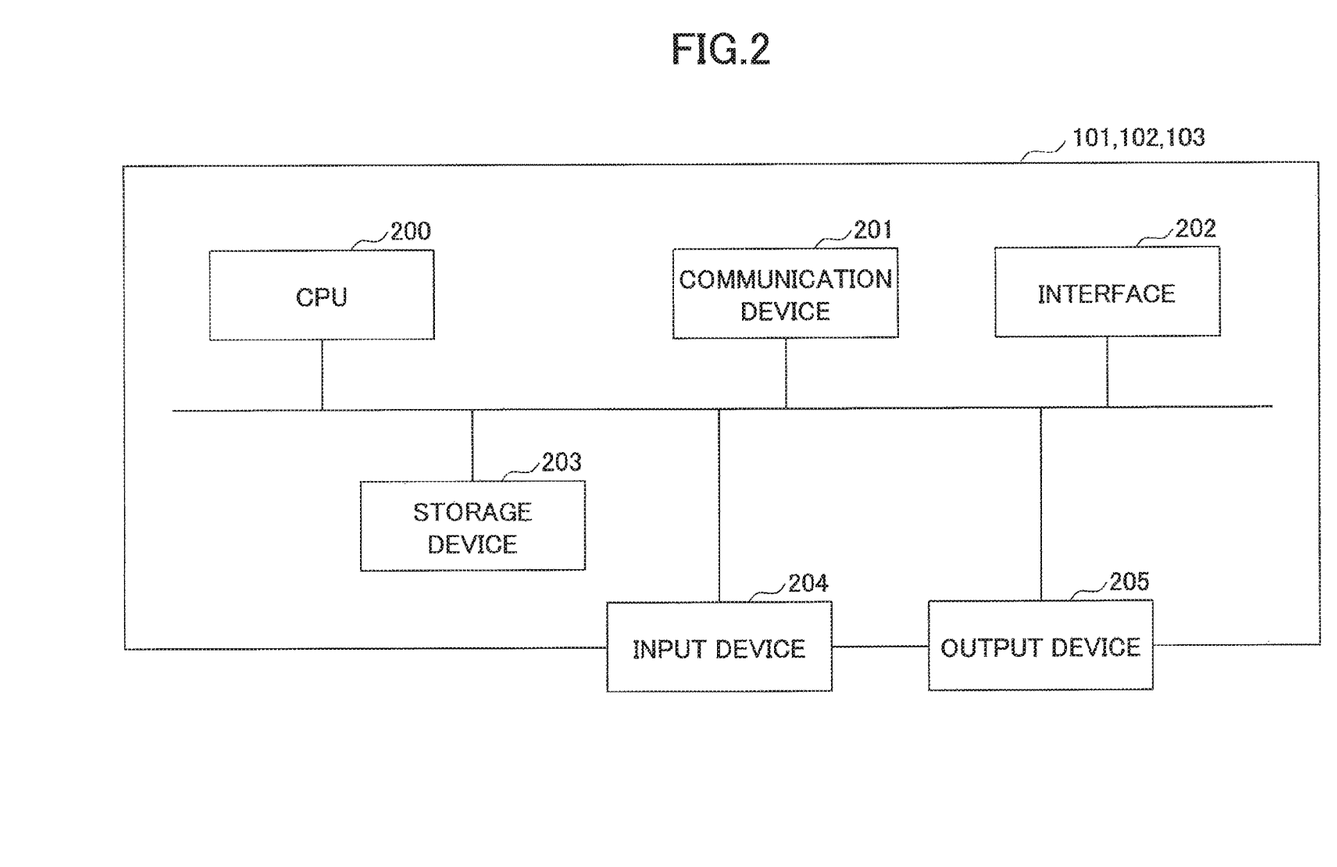
FIG. 2 is a block diagram illustrating a hardware configuration example of an information processing apparatus according to an embodiment of the present invention.

FIG. 2 is a block diagram illustrating a hardware configuration example of the information processing apparatus according to an embodiment of the present invention. For example, the first information processing apparatus 101, the second information processing apparatus 102, and the third information processing apparatus 103 have the same hardware configuration. Hereinafter, the first information processing apparatus 101 will be described as an example, and descriptions of the second information processing apparatus 102 and the third information processing apparatus 103 will be omitted.

For example, the first information processing apparatus 101 has a hardware configuration including a CPU (Central Processing Unit) 200, a communication device 201, an interface 202, a storage device 203, an input device 204, and an output device 205.

The CPU 200 is an example of an arithmetic device and a control device.

The communication device 201 is a device that communicates with an external device in a wired or wireless manner. For example, the communication device 201 is a network card, etc.

The interface 202 is a device that transmits and receives data to and from the outside. For example, the interface 202 is a connector, etc.

The storage device 203 is, for example, a main storage device, etc. Note that the storage device 203 may have an auxiliary storage device such as a hard disk.

The input device 204 is a device for inputting operations by the user. For example, the input device 204 is a keyboard, a mouse, or a combination thereof, etc.

The output device 205 is a device that outputs processing results, etc., to the user. For example, the output device 205 is a display, etc.

As illustrated in the figure, the first information processing apparatus 101, the second information processing apparatus 102, and the third information processing apparatus 103 are, for example, a PC (Personal Computer), a server, a notebook PC, a smartphone, or a combination thereof, etc.

Note that the hardware configuration is not limited to the illustrated configuration. For example, the first information processing apparatus 101, the second information processing apparatus 102, and the third information processing apparatus 103 may have different hardware configurations.

Furthermore, a plurality of hardware configurations may be provided outside or inside the information processing apparatus.

<Overall Processing Example>

Figure 3:
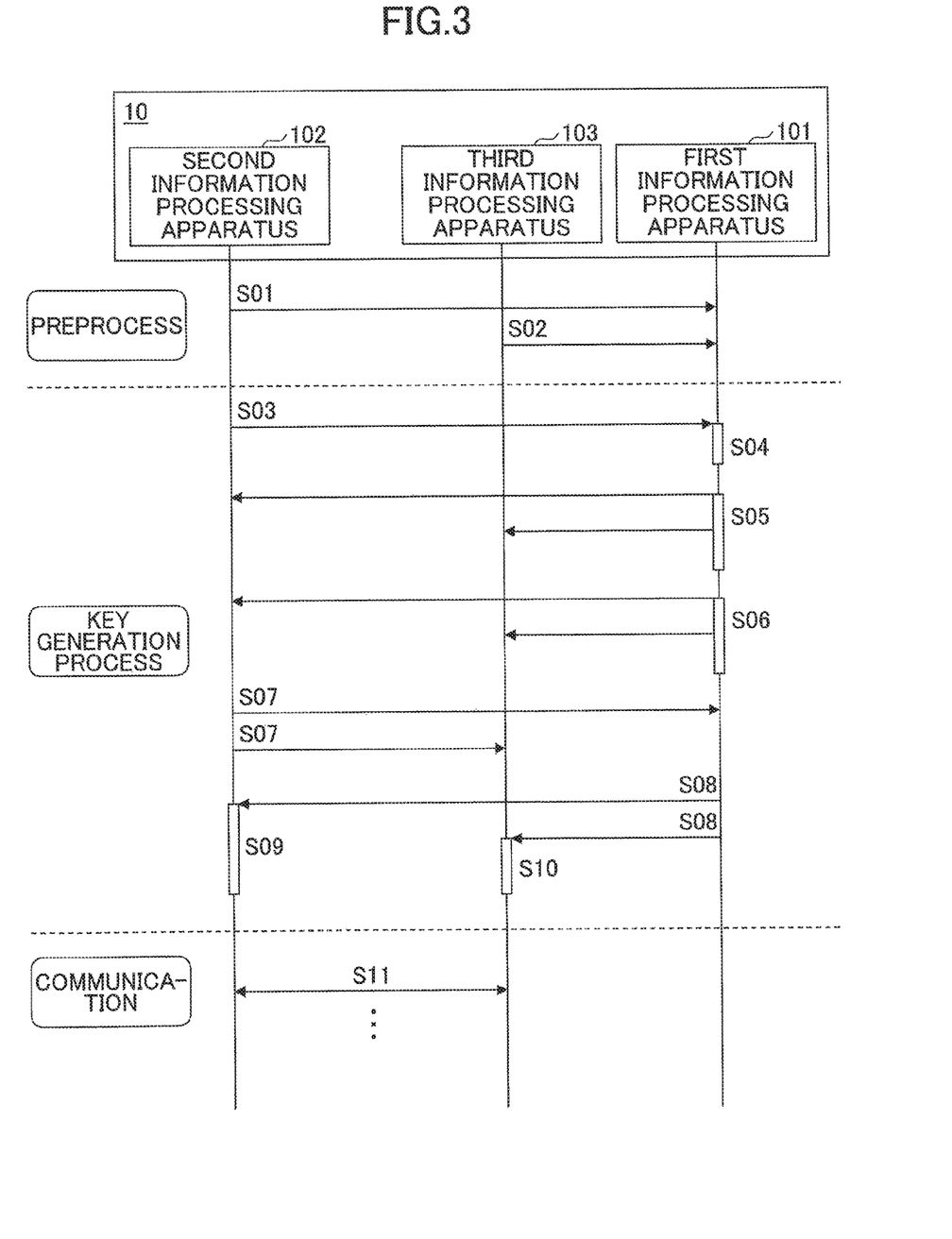
FIG. 3 is a sequence diagram illustrating an example of overall processing by an information processing system according to an embodiment of the present invention.

FIG. 3 is a sequence diagram illustrating an example of overall processing by the information processing system according to an embodiment of the present invention. First, the information processing system 10 performs a "preprocess" before "key generation process", which will be described later. The preprocess is, for example, a process including steps S01 and S02 described below.

<Preprocess Example>

<Example of Authenticating Second Information Processing Apparatus> (Step S01)

In step S01, the first information processing apparatus 101 authenticates the second information processing apparatus 102.

<Example of Authenticating Third Information Processing Apparatus> (Step S02)

In step S02, the first information processing apparatus 101 authenticates the third information processing apparatus 103.

As described above, when steps S01 and S02 are performed, the second information processing apparatus 102 and the third information processing apparatus 103 are registered in the first information processing apparatus 101.

Note that it is desirable to use biometric authentication. When biometric authentication is used, it is possible to reduce fraudulent registration performed by so-called "impersonation".

Furthermore, the first information processing apparatus 101 preferably authenticates the second information processing apparatus 102 and the third information processing apparatus 103, upon determining that the second information processing apparatus 102 and the third information processing apparatus 103 are registered from a predetermined area. For example, in the authentication, the second information processing apparatus 102 and the third information processing apparatus 103 transmit GPS (Global Positioning System) data, etc., indicating the respective positions of the apparatuses, to the first information processing apparatus 101. Then, the first information processing apparatus 101 authenticates the second information processing apparatus 102 and the third information processing apparatus 103 when the position indicated by the GPS data is within a predetermined area that is set in advance. That is, unless registration is made from within a predetermined area, the first information processing apparatus 101 does not authenticate the corresponding apparatus. In this way, security can be improved, because the apparatus is not authenticated unless the registration is made from an area set in advance.

Note that the "preprocess" may be performed before the "key generation process"; however, the information processing system 10 is not required to perform the "preprocess" and the "key generation process" consecutively.

After the authentication, secure communication is possible between the first information processing apparatus 101 and the second information processing apparatus 102. That is, after the authentication, communication between the first information processing apparatus 101 and the second information processing apparatus 102 is in a state where "impersonation" and fraudulent data acquisition, etc., cannot be performed. Similarly, after the authentication, secure communication is possible between the communication between the first information processing apparatus 101 and the third information processing apparatus 103.

After the "preprocess" as described above is performed, the information processing system 10 performs a "key generation process" as described below. Hereinafter, an example will be described in which a "key generation process" is started when the second information processing apparatus 102 attempts to access the third information processing apparatus 103.

<Example of Key Generation Process>
<Example of Access Request to Third Information Processing Apparatus> (Step S03)

In step S03, the second information processing apparatus 102 makes an access request to the third information processing apparatus 103. That is, the second information processing apparatus 102 sends, to the first information processing apparatus 101, a request to perform encrypted communication with the third information processing apparatus 103.

<Example of Checking Second Information Processing Apparatus and Third Information Processing Apparatus> (Step S04)

In step S04, the first information processing apparatus 101 checks the second information processing apparatus 102 and the third information processing apparatus 103. That is, the first information processing apparatus 101 checks whether the second information processing apparatus 102 and the third information processing apparatus 103 are not performing "impersonation", etc., based on the results of authentication performed in advance in steps S01 and S02.

<Example of Requesting Redirection Session Between Second Information Processing Apparatus and Third Information Processing Apparatus> (Step S05)

In step S05, the first information processing apparatus 101 requests a redirection session to the second information processing apparatus 102 and the third information processing apparatus 103.

<Example of Allowing Redirection Session Between Second Information Processing Apparatus and Third Information Processing Apparatus> (Step S06)

In step S06, the first information processing apparatus 101 allows a redirection session between the second information processing apparatus 102 and the third information processing apparatus 103.

By the above-described steps S05 and S06, etc., communication between the second information processing apparatus 102 and the third information processing apparatus 103 is started in the information processing system 10. Note that processes other than steps S05 and S06 may be performed as preparation processes for communication.

<Example of Transmission of First Data> (Step S07)

In step S07, the second information processing apparatus 102 transmits seed data, serving as an example of first data, to the first information processing apparatus 101 and the third information processing apparatus 103. Note that the respective pieces of first data transmitted to the first information processing apparatus 101 and the third information processing apparatus 103 are data indicating similar contents.

<Example of Transmitting Second Data> (Step S08)

In step S08, the first information processing apparatus 101 transmits second data to the second information processing apparatus 102 and the third information processing apparatus 103, respectively.

The second data is data indicating a method of generating a key based on the first data. For example, the second data is data indicating an algorithm, etc., for generating a key.

That is, when the first data and the second data are assembled, a key can be generated. For example, it is assumed that a key is generated as indicated by the following formula (1).

$$\text{Key} = p^x \bmod g \quad \text{formula (1)}$$

In the above formula (1), "mod" is an operator indicating remainder (modulo) calculation, and calculates the remainder when dividing by the constant "g". For example, the first data is data indicating the constant "X" in formula (1). On the other hand, the second data is data indicating the above formula (1). Therefore, by assigning the constant "X" indicated by the first data into formula (1) indicated by the second data, if the constants "p" and "g" are known, the key is uniquely defined.

Note that the first data and the second data are not limited to the above combination. For example, the first data may indicate the constant "X" in formula (1) and the second data may indicate the constant "p", etc. In this case, it is assumed that the constant "g" and formula (1) are publicly disclosed in advance. In this way, other than the first data and the second data, data that is publicly disclosed in advance, etc., may be used for the generation of the key. Note that that the algorithm need not be formula (1). However, in the algorithm, if an operator requiring high calculation costs by the arithmetic device, such as multiplication, exponentiation, or remainder, is used as in formula (1) above, it will be difficult to identify the key, and, therefore, the algorithm preferably includes an operator such as multiplication, exponentiation, or remainder.

<Example of Key Generation> (Steps S09 and S10)

In step S09, the second information processing apparatus 102 generates a key. Similarly, in step S10, the third information processing apparatus 103 generates a key.

First, the second information processing apparatus 102 generates a key based on the first data transmitted in step S07 and the second data acquired from the first information processing apparatus 101 in step S08.

On the other hand, the third information processing apparatus 103 generates a key based on the first data acquired from the second information processing apparatus 102 in step S07 and the second data acquired from the first information processing apparatus 101 in step S08.

The second information processing apparatus 102 and the third information processing apparatus 103 generate keys using the same first data and second data. Therefore, in steps S09 and S10, the second information processing apparatus 102 and the third information processing apparatus 103 generate the same key. Therefore, when steps S09 and S10 are performed, the second information processing apparatus 102 and the third information processing apparatus 103 can have a common key.

After the "key generation process" as described above is performed, the information processing system 10 performs "communication" as described below.

<Example of Communication>
<Example of Encrypted Communication by Common Key Method> (Step S11)

In step S11, the second information processing apparatus 102 and the third information processing apparatus 103 perform encrypted communication by using a common key method. For example, the second information processing apparatus 102 and the third information processing apparatus 103 transmit and receive data by obfuscating the data by the AES (Advanced Encryption Standard) method using the keys that have been generated in steps S09 and S10.

Note that the "key generation process", etc., may be performed periodically or irregularly, and the keys, etc., may be updated.

<Processing Result Example>

Figure 4:
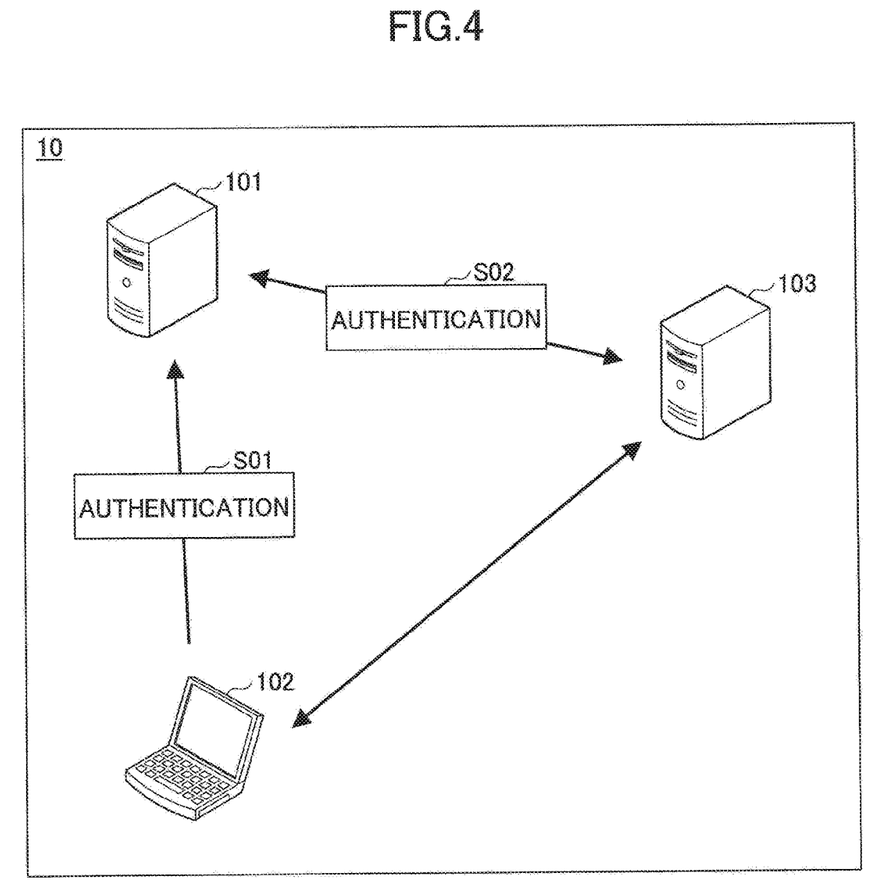
FIG. 4 is a schematic diagram illustrating a processing result example (part 1) of the overall processing by the information processing system according to an embodiment of the present invention.

FIG. 4 is a schematic diagram illustrating a processing result example (part 1) of the overall processing by the information processing system according to an embodiment of the present invention. First, when the authentication in step S01 in "preprocess" is performed, secure communication can be performed between the first information processing apparatus 101 and the second information processing apparatus 102, as illustrated in the figure.

Similarly, when the authentication in step S02 is performed, secure communication can be performed between the first information processing apparatus 101 and the third information processing apparatus 103, as illustrated in the figure.

Figure 5:
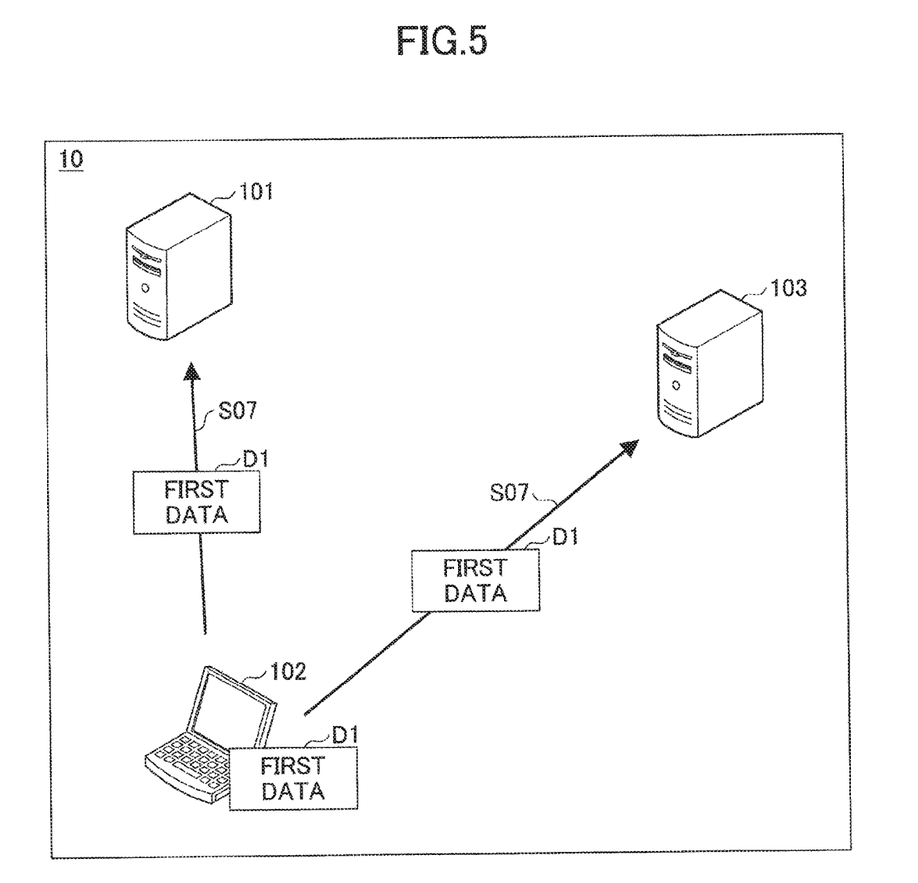
FIG. 5 is a schematic diagram illustrating a processing result example (part 2) of the overall processing by the information processing system according to an embodiment of the present invention.

FIG. 5 is a schematic diagram illustrating a processing result example (part 2) of the overall processing by the information processing system according to an embodiment of the present invention. After the process as illustrated in FIG. 4, when step S07 in the "key generation process" is performed, the first information processing apparatus 101 and the third information processing apparatus 103 can acquire first data D1, as illustrated in the figure.

Figure 6:
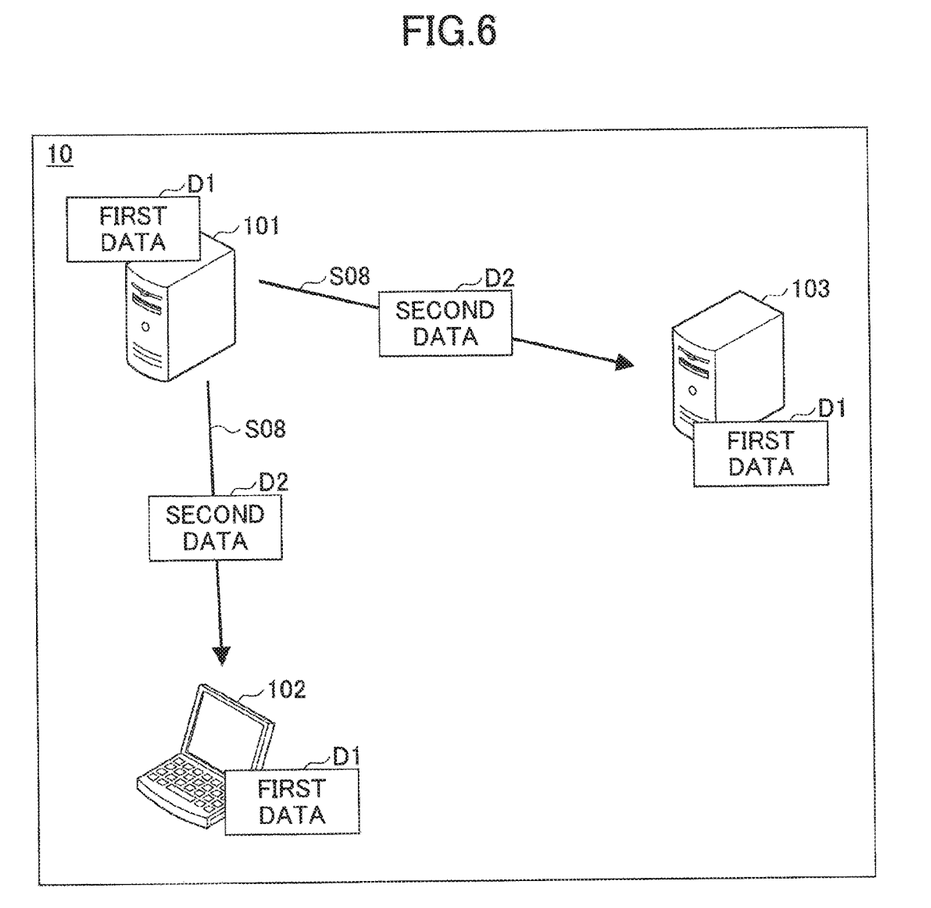
FIG. 6 is a schematic diagram illustrating a processing result example (part 3) of the overall processing by the information processing system according to an embodiment of the present invention.

FIG. 6 is a schematic diagram illustrating a processing result example (part 3) of the overall processing by the information processing system according to an embodiment of the present invention. After the process illustrated in FIG. 5 is performed, when step S08 in "key generation process" is performed, the second information processing apparatus 102 and the third information processing apparatus 103 can acquire second data D2, as illustrated in the figure.

Therefore, when the overall process is performed as described above, the second information processing apparatus 102 and the third information processing apparatus 103 can hold the same first data D1 and second data D2 as described below.

Figure 7:
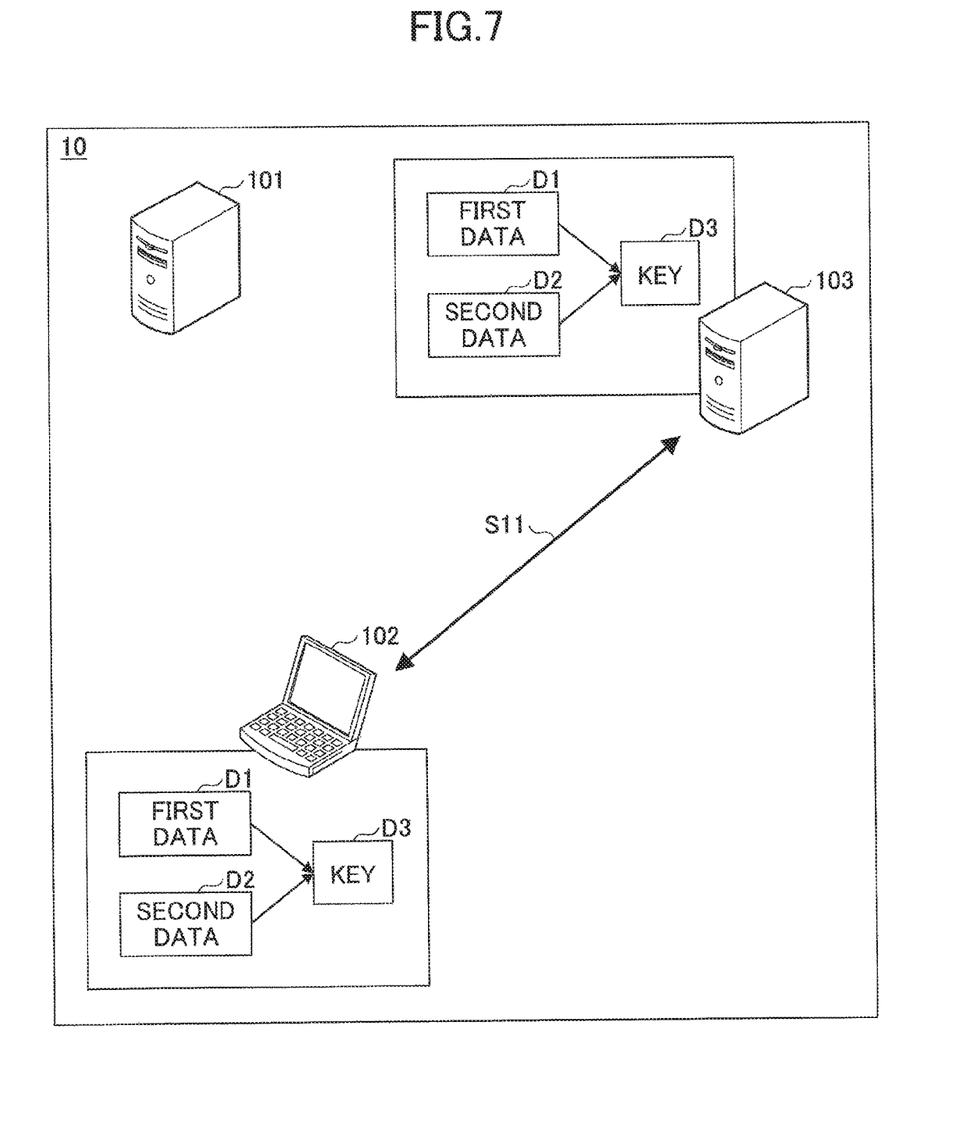
FIG. 7 is a schematic diagram illustrating a processing result example (part 4) of the overall processing by the information processing system according to an embodiment of the present invention.

FIG. 7 is a schematic diagram illustrating a processing result example (part 4) of the overall processing by the information processing system according to an embodiment of the present invention. As illustrated in the figure, when steps S09 and S10 are performed in a state where the same first data D1 and the same second data D2 are held in the second information processing apparatus 102 and the third information processing apparatus 103, the same key D3 is generated in the second information processing apparatus 102 and the third information processing apparatus 103. Therefore, the second information processing apparatus 102 and the third information processing apparatus 103 can have a common key D3. In this way, when the common key D3 is used, in step S11, the second information processing apparatus 102 and the third information processing apparatus 103 can perform encrypted communication by using the common key method, thereby improving security.

<Comparative Example>

Figure 8:
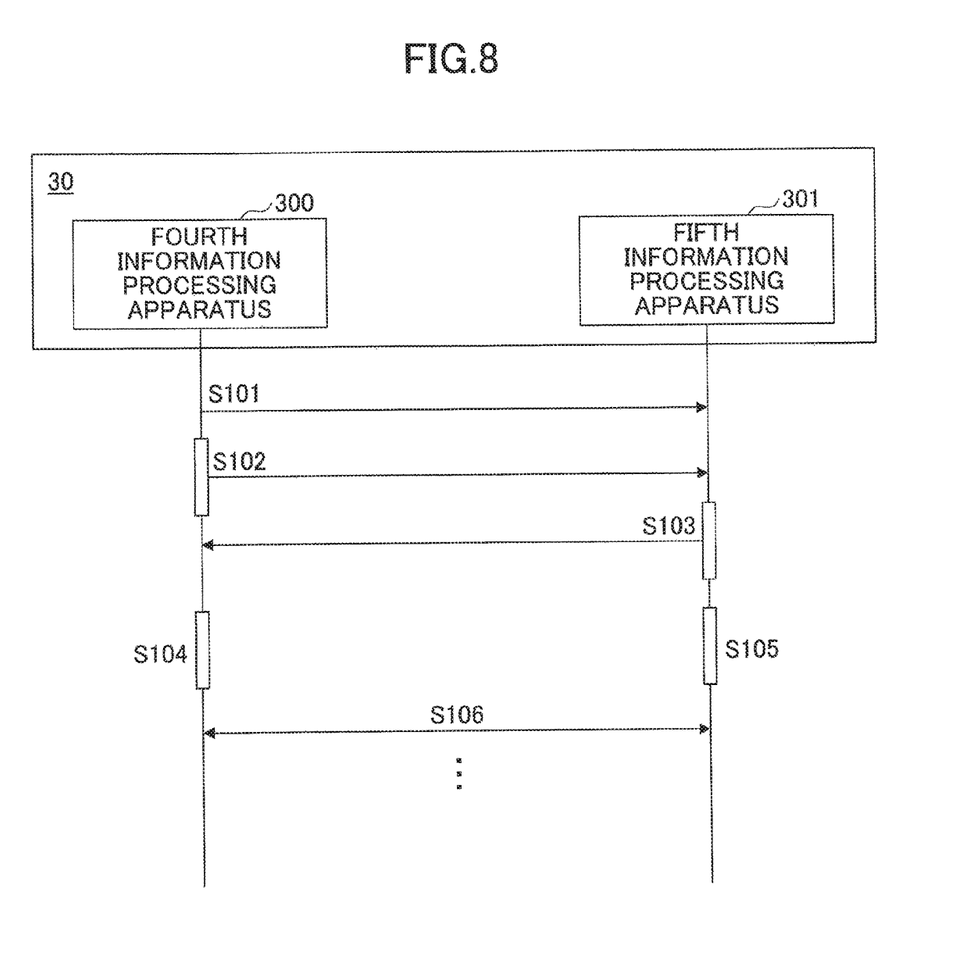
FIG. 8 is a sequence diagram illustrating an example of overall processing by an information processing system according to a comparative example.

FIG. 8 is a sequence diagram illustrating an example of the overall processing by an information processing system according to a comparative example. Hereinafter, a comparative example of the overall process performed by a comparative example information processing system 30 of the DH method will be described.

Note that as illustrated in the figure, the comparative example information processing system 30 has an overall configuration including a fourth information processing apparatus 300 and a fifth information processing apparatus 301. In the comparative example information processing system 30, encrypted communication is performed between the fourth information processing apparatus 300 and the fifth information processing apparatus 301.

<Example of Access Request to Fifth Information Processing Apparatus> (Step S101)

In step S101, the fourth information processing apparatus 300 makes an access request to the fifth information processing apparatus 301.

<Example of Generating and Transmitting First Key Component Data to Fifth Information Processing Apparatus> (Step S102)

In step S102, the fourth information processing apparatus 300 generates first key component data and transmits the first key component data to the fifth information processing apparatus 301.

<Example of Generating and Transmitting Second Key Component Data to Fourth Information Processing Apparatus> (Step S103)

In step S103, the fifth information processing apparatus 301 generates second key component data and transmits the second key component data to the fourth information processing apparatus 300.

<Example of Key Generation> (Steps S104 and S105)

In step S104, the fourth information processing apparatus 300 generates a key. Similarly, in step S105, the fifth information processing apparatus 301 generates a key.

First, the fourth information processing apparatus 300 generates a key based on the first key component data transmitted in step S102 and the second key component data acquired from the fifth information processing apparatus 301 in step S103.

On the other hand, the fifth information processing apparatus 301 generates a key based on the first key component data acquired from the fourth information processing apparatus 300 in step S102 and the second key component data that is transmitted in step S103.

For example, the key is generated as indicated by the following formula (2).

$$\text{Key} = x \text{ XOR } y \qquad \text{formula (2)}$$

In formula (2) above, "XOR" is an operator for performing exclusive OR calculation. Furthermore, in the above formula (2), "x" is the value indicated by the first key component data. Similarly, in the above formula (2), "y" is the value indicated by the second key component data. Therefore, in the case where the key is generated by the above formula (2) in both steps S104 and S105, if the first key component data and the second key component data are common, a common key is generated.

Note that it is preferable that the key is generated such that the key has 128 bits, 192 bits, or 256 bits. In the case where the AES method is used in the communication performed in the subsequent stage, the key length is defined by the standard. Therefore, in key generation, it is desirable to generate a key that conforms to the standard.

<Example of Encrypted Communication by Common Key Method> (Step S106)

In step S106, the fourth information processing apparatus 300 and the fifth information processing apparatus 301 perform encrypted communication by the common key method. For example, the fourth information processing apparatus 300 and the fifth information processing apparatus 301 transmit and receive data by obfuscating the data by the AES method, etc., using the keys generated in step S104 and step S105.

<Example of Man-in-the-Middle Attack>

There are cases where the above-described comparative example information processing system 30 receives, for example, a "man-in-the-middle attack" described below.

Figure 9A:
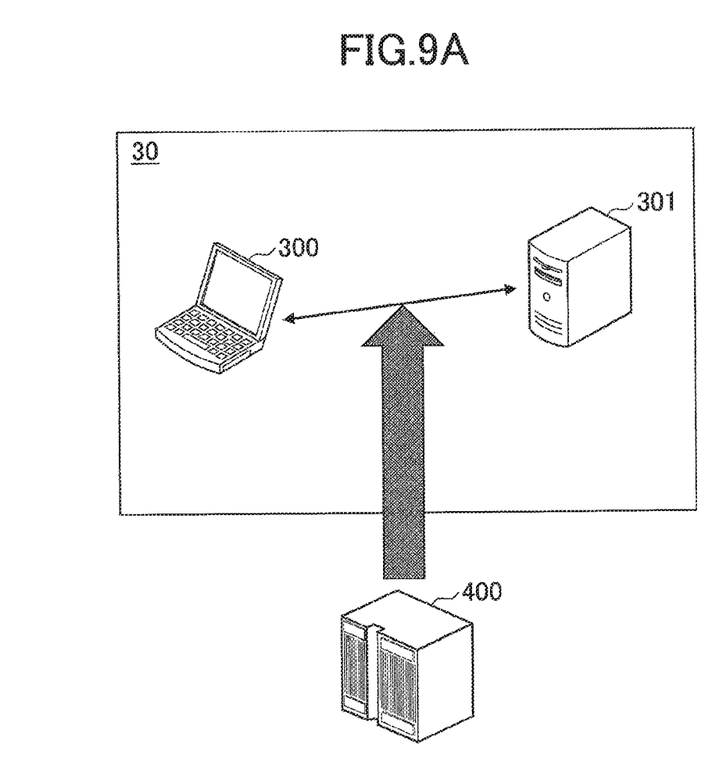
FIGS. 9A and 9B are conceptual diagrams illustrating an example of a man-in-the-middle attack on an information processing system according to a comparative example.
Figure 9B:
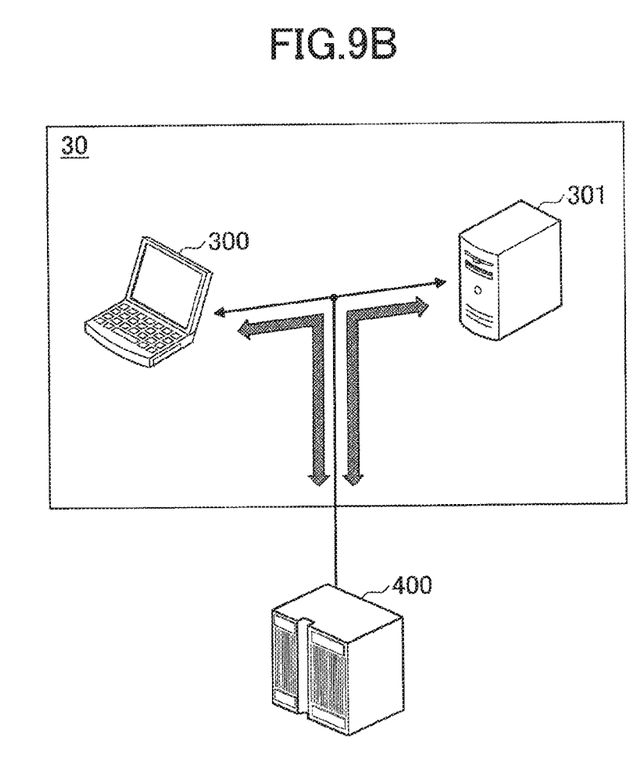

FIGS. 9A and 9B are conceptual diagrams illustrating an example of a man-in-the-middle attack on the information processing system according to the comparative example. First, as illustrated in FIG. 9A, a sixth information processing apparatus 400, which is used by a third party attempting to fraudulently acquire data (hereinafter referred to as a "man-in-the-middle"), is connected to a communication path between the fourth information processing apparatus 300 and the fifth information processing apparatus 301. Note that it is assumed that the fourth information processing apparatus 300 and the fifth information processing apparatus 301 cannot detect that the sixth information processing apparatus 400 has been connected.

When the sixth information processing apparatus 400 is connected to a point as illustrated in FIG. 9A, the subsequent communication path will be, for example, as illustrated in FIG. 9B. Specifically, in the illustrated example, data to be transmitted from the fourth information processing apparatus 300 to the fifth information processing apparatus 301 is transmitted to the fifth information processing apparatus 301 via the sixth information processing apparatus 400. In this case, unless the data is deleted or falsified by the sixth information processing apparatus 400, the data will seem to be successfully transmitted and received, and therefore there are cases where the fourth information processing apparatus 300 and the fifth information processing apparatus 301 cannot detect that the content of data is fraudulently acquired by the sixth information processing apparatus 400.

Similarly, data to be transmitted from the fifth information processing apparatus 301 to the fourth information processing apparatus 300 is also transmitted to the fourth information processing apparatus 300 via the sixth information processing apparatus 400.

Therefore, by performing a man-in-the-middle attack, the sixth information processing apparatus 400 may be able to fraudulently acquire the data to be transmitted and received between the fourth information processing apparatus 300 and the fifth information processing apparatus 301.

Thus, there is a possibility that the sixth information processing apparatus 400 can acquire both the first key component data and the second key component data transmitted in steps S102 and S103. As described above, when the first key component data and the second key component data are acquired, there is a possibility that a key can be generated, so there is a possibility that the security is not sufficient in the configuration of the comparative example information processing system 30.

<Functional Configuration Example>

On the other hand, for example, the following is the information processing system 10 according to the present embodiment.

Figure 10:
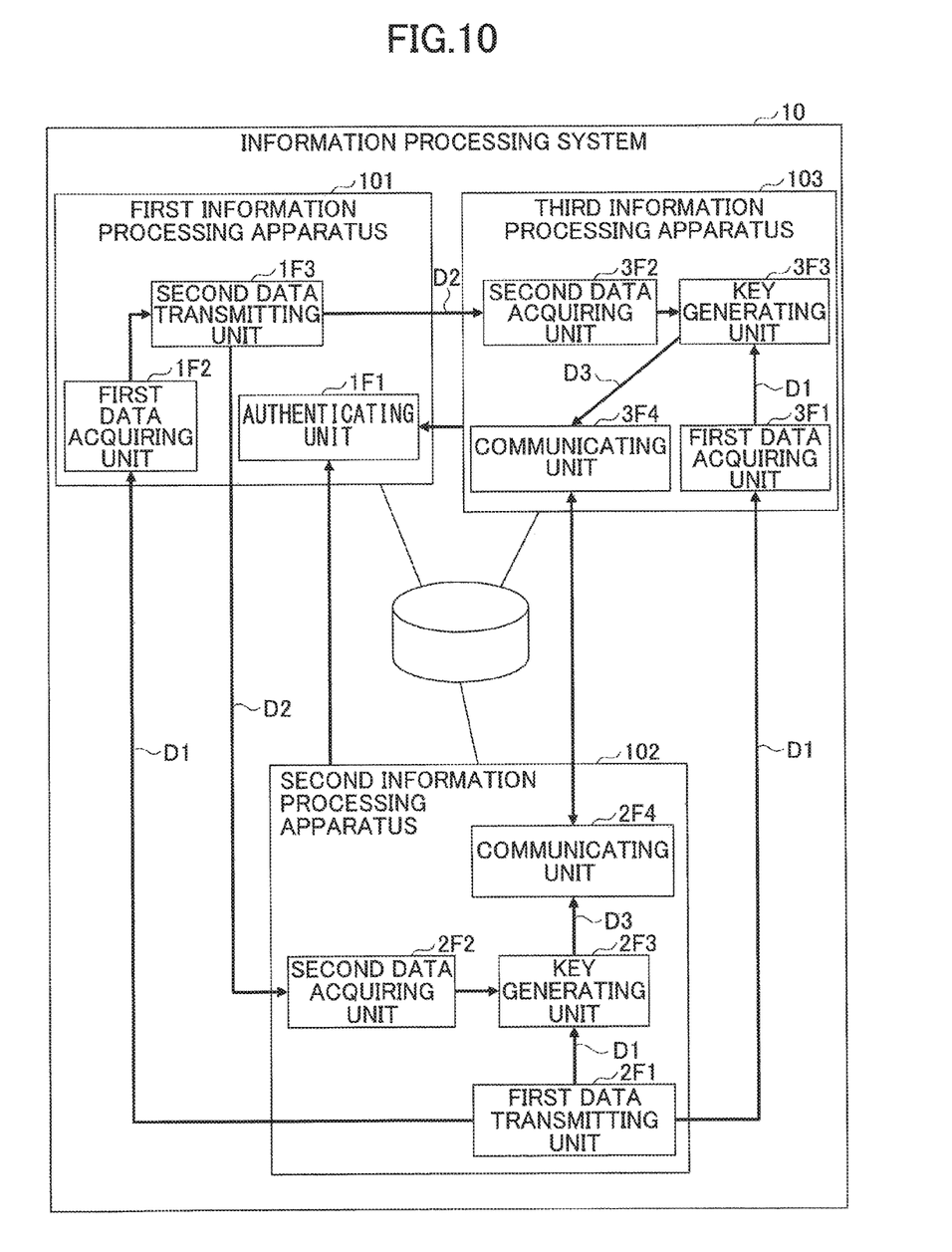
FIG. 10 is a functional block diagram illustrating a functional configuration example of an information processing system according to an embodiment of the present invention.

FIG. 10 is a functional block diagram illustrating a functional configuration example of the information processing system according to an embodiment of the present invention. For example, as illustrated in the figure, the first information processing apparatus 101 included in the information processing system 10 has a functional configuration including an authenticating unit 1F1, a first data acquiring unit 1F2, and a second data transmitting unit 1F3. As illustrated in the figure, the second information processing apparatus 102 included in the information processing system 10 has a functional configuration including a first data transmitting unit 2F1, a second data acquiring unit 2F2, a key generating unit 2F3, and a communicating unit 2F4. Furthermore, as illustrated in the figure, the third information processing apparatus 103 included in the information processing system 10 has a functional configuration including a first data acquiring unit 3F1, a second data acquiring unit 3F2, a key generating unit 3F3, and a communicating unit 3F4.

The authenticating unit 1F1 performs an authentication procedure for authenticating the second information processing apparatus 102 and the third information processing apparatus 103. For example, the authenticating unit 1F1 is implemented by the CPU 200, etc.

The first data acquiring unit 1F2 performs a first data acquisition procedure to acquire the first data D1 from the second information processing apparatus 102. For example, the first data acquiring unit 1F2 is implemented by the communication device 201, etc.

The second data transmitting unit 1F3 performs a second data transmission procedure of transmitting the second data D2 indicating how to generate the key D3 based on the first data D1, to each of the second information processing apparatus 102 and the third information processing apparatus 103. For example, the second data transmitting unit 1F3 is implemented by the communication device 201, etc.

The first data transmitting unit 2F1 performs a first data transmission procedure of transmitting the first data D1 to each of the first information processing apparatus 101 and the third information processing apparatus 103. For example, the first data transmitting unit 2F1 is implemented by the communication device 201, etc.

The second data acquiring unit 2F2 performs a second data acquisition procedure to acquire the second data D2 from the first information processing apparatus 101. For example, the second data acquiring unit 2F2 is implemented by the communication device 201, etc.

The key generating unit 2F3 performs a key generation procedure for generating the key D3 based on the first data D1 and the second data D2. For example, the key generating unit 2F3 is implemented by the CPU 200, etc.

The communicating unit 2F4 performs a communication procedure to communicate with the third information processing apparatus 103 based on the key D3 generated by the key generating unit 2F3. For example, the communicating unit 2F4 is implemented by the communication device 201, etc.

The first data acquiring unit 3F1 performs a first data acquisition procedure to acquire the first data D1 from the second information processing apparatus 102. For example, the first data acquiring unit 3F1 is implemented by the communication device 201, etc.

The second data acquiring unit 3F2 performs a second data acquisition procedure to acquire the second data D2 from the first information processing apparatus 101. For example, the second data acquiring unit 3F2 is implemented by the communication device 201, etc.

The key generating unit 3F3 performs a key generation procedure for generating the key D3 based on the first data D1 and the second data D2. For example, the key generating unit 3F3 is implemented by the CPU 200, etc.

The communicating unit 3F4 performs a communication procedure to communicate with the second information processing apparatus 102 based on the key D3 generated by the key generating unit 3F3. For example, the communicating unit 3F4 is implemented by the communication device 201, etc.

With the configuration as illustrated in the figure, authentication is performed by the authenticating unit 1F1, and therefore it is difficult for a man-in-the-middle, etc., to fraudulently access the communication between the first information processing apparatus 101 and the second information processing apparatus 102 and the communication between the first information processing apparatus 101 and the third information processing apparatus 103. Therefore, it is difficult to fraudulently acquire the second data D2 by a man-in-the-middle attack, etc. Furthermore, it is difficult to generate the key D3 without both the first data D1 and the second data D2, and therefore even if the data obfuscated by the key D3 is fraudulently acquired, it is difficult to decrypt the data obfuscated by the key D3. Therefore, the information processing system 10 can improve the security of the data transmitted and received by encrypted communication, between the communicating unit 2F4 and the communicating unit 3F4.

As described above, it is desirable to use unique pieces of information, such as the first data and the second data, etc., and perform authentication among three or more information processing apparatuses, and perform communication upon reaching an agreement.

<Application Example>

The present embodiment may be operated in combination with, for example, VPN (a Virtual Private Network, a virtual private line), etc.

Furthermore, a DNS (Domain Name System) server, etc., may be used in the present embodiment. Furthermore, the present embodiment may be operated in combination with, for example, BYOD (Bring your own device), etc.

<Other Embodiments>

Each apparatus, such as the first information processing apparatus, the second information processing apparatus, and the third information processing apparatus, is not required to be implemented by a single apparatus. That is, each apparatus may be formed of a plurality of apparatuses. For example, each apparatus may include a plurality of information processing apparatuses, and each process may be executed in a distributed manner, a parallel manner, or a redundant manner.

The information processing system according to the present embodiment may include apparatuses that can perform processes in an autonomously decentralized manner.

Note that all or part of the processes according to an embodiment of the present invention may be described in a low-level language such as an assembler or a high-level language such as an object-oriented language, and may be implemented by a program for causing a computer to execute an information processing method. That is, the program is a computer program for causing a computer such as an information processing apparatus or an information processing system to execute each process.

Therefore, when the information processing method is executed based on the program, the arithmetic device and the control device included in the computer perform calculation and control based on the program in order to execute each process. Furthermore, the storage device included in the computer stores data used for processing, based on the program, in order to execute each process.

Furthermore, the program can be recorded and distributed in a computer-readable recording medium. The recording medium is a medium such as a magnetic tape, a flash memory, an optical disk, a magneto-optical disk, or a magnetic disk, etc. Furthermore, the program can be distributed through an electric communication line.

According to one embodiment of the present invention, an information processing system, an information processing method, and a recording medium that can improve the security of obfuscated data, can be provided.

Although the preferred embodiments of the present invention have been described in detail above, the present invention is not limited to the above-described embodiments, etc. Accordingly, various modifications or changes can be made to the embodiments within the scope of the gist of the present invention described in the claims.

What is claimed is:

1. An information processing system comprising:
a first information processing apparatus;
a second information processing apparatus; and
a third information processing apparatus, wherein
the first information processing apparatus includes
a first processor; and
a first memory storing program instructions that cause the first processor to:
authenticate the second information processing apparatus and the third information processing apparatus,
receive seed data transmitted from the second information processing apparatus, and
transmit a key generating algorithm indicating a method of generating a key based on the seed data, to the second information processing apparatus and the third information processing apparatus,
the second information processing apparatus includes
a second processor; and
a second memory storing program instructions that cause the second processor to:
transmit the seed data to the first information processing apparatus and the third information processing apparatus,
receive the key generating algorithm from the first information processing apparatus, and
generate the key based on the seed data and the key generating algorithm, the seed data and the key generating algorithm both being received from the first information processing apparatus,
the third information processing apparatus includes
a third processor; and
a third memory storing program instructions that cause the third processor to:
receive the seed data transmitted from the second information processing apparatus,
receive the key generating algorithm transmitted from the first information processing apparatus,
generate the key based on the seed data received from the second information processing apparatus and the key generating algorithm received from the first information processing apparatus,
the second information processing apparatus and the third information processing apparatus generate the same key, and
communication between the second information processing apparatus and the third information processing apparatus is encrypted based on the generated key.

2. The information processing system according to claim 1, wherein the first processor performs biometric authentication.

3. The information processing system according to claim 1, wherein the first processor authenticates the second information processing apparatus or the third information processing apparatus, in response to determining that the second information processing apparatus or the third information processing apparatus is registered from a predetermined area.

4. An information processing method performed by an information processing system, the information processing system including
a first information processing apparatus,
a second information processing apparatus, and
a third information processing apparatus, the information processing method comprising:

authenticating, by the first information processing apparatus, the second information processing apparatus and the third information processing apparatus;

transmitting, by the second information processing apparatus, seed data to the first information processing apparatus and to the third information processing apparatus, receiving, by the first information processing apparatus and the third information processing apparatus, the seed data transmitted from the second information processing apparatus;

transmitting, by the first information processing apparatus, a key generating algorithm indicating a method of generating a key based on the seed data, to the second information processing apparatus and to the third information processing apparatus is response to receiving the speed data transmitted from the second information processing apparatus;

receiving, by the second information processing apparatus and the third information processing apparatus, the key generating algorithm from the first information processing apparatus;

generating, by the second information processing apparatus, the key based on the seed data and the key generating algorithm that both are received from the first information processing apparatus;

generating, by the third information processing apparatus, the key based on the seed data received from the second information processing apparatus and the key generating algorithm received from the first information processing apparatus, with the second information processing apparatus and the third information processing apparatus generating the same key;

encrypting communication between the second information processing apparatus and the third information processing apparatus, by the second information processing apparatus and third information processing apparatus, based on the generated key.

* * * * *